United States Patent [19]
Georgellis et al.

[11] Patent Number: 5,994,482
[45] Date of Patent: Nov. 30, 1999

[54] POLYPROPYLENE COPOLYMER ALLOYS AND PROCESS FOR MAKING

[75] Inventors: George Byron Georgellis, Houston; Chia Yung Cheng, Seabrook; William Moa-Tseng Chien, Houston, all of Tex.

[73] Assignee: Exxon Chemical Patents, Inc., Baytown, Tex.

[21] Appl. No.: 08/811,557

[22] Filed: Mar. 4, 1997

[51] Int. Cl.⁶ .................................. C08F 2/04; C08F 2/34
[52] U.S. Cl. ............................. 526/65; 525/240; 526/348
[58] Field of Search .................................. 442/400, 401, 442/402, 403, 405; 525/240; 526/65, 348

[56] References Cited

U.S. PATENT DOCUMENTS

| | | | |
|---|---|---|---|
| 4,547,552 | 10/1985 | Toyota et al. | 525/247 |
| 4,810,556 | 3/1989 | Kobayashi et al. | 428/152 |
| 5,023,300 | 6/1991 | Huff et al. | 525/194 |
| 5,078,935 | 1/1992 | Kobayashi et al. | 264/103 |
| 5,210,139 | 5/1993 | Huff et al. | 525/194 |
| 5,449,738 | 9/1995 | Koura et al. | 525/247 |

FOREIGN PATENT DOCUMENTS

| | | |
|---|---|---|
| 119 508 A2 | 9/1984 | European Pat. Off. . |
| 527 589 A1 | 2/1993 | European Pat. Off. . |
| 63-69269 | 3/1988 | Japan . |
| WO 88/02376 | 4/1988 | WIPO . |

OTHER PUBLICATIONS

Floor, John E., Shell Development Company, Gas Phase Random Copolymers For Polypropylene Film Applications, *Polyolefins VII*, Feb., 1991, Houston, Texas, pp. 309–333.

*Primary Examiner*—Melvyn I. Marquis
*Assistant Examiner*—D. Aylward
*Attorney, Agent, or Firm*—Douglas W. Miller; C. Paige Schmidt

[57] ABSTRACT

The present invention relates to polypropylene alloys which are especially suited for soft fiber and fabric applications. An embodiment of these alloys comprise an ethylene-propylene random copolymer having an ethylene content of from about 1.0 to 5.0% by weight, in an amount of from about 40 to 90% by weight of the alloy; and an ethylene-propylene bipolymer having an ethylene content of from about 10 to 30% by weight, in an amount of from about 10 to 60% by weight of the alloy. The present invention further relates to a hybrid process for making these alloys.

10 Claims, 5 Drawing Sheets

Fig. 5    "SOFTNESS" COMPARISON
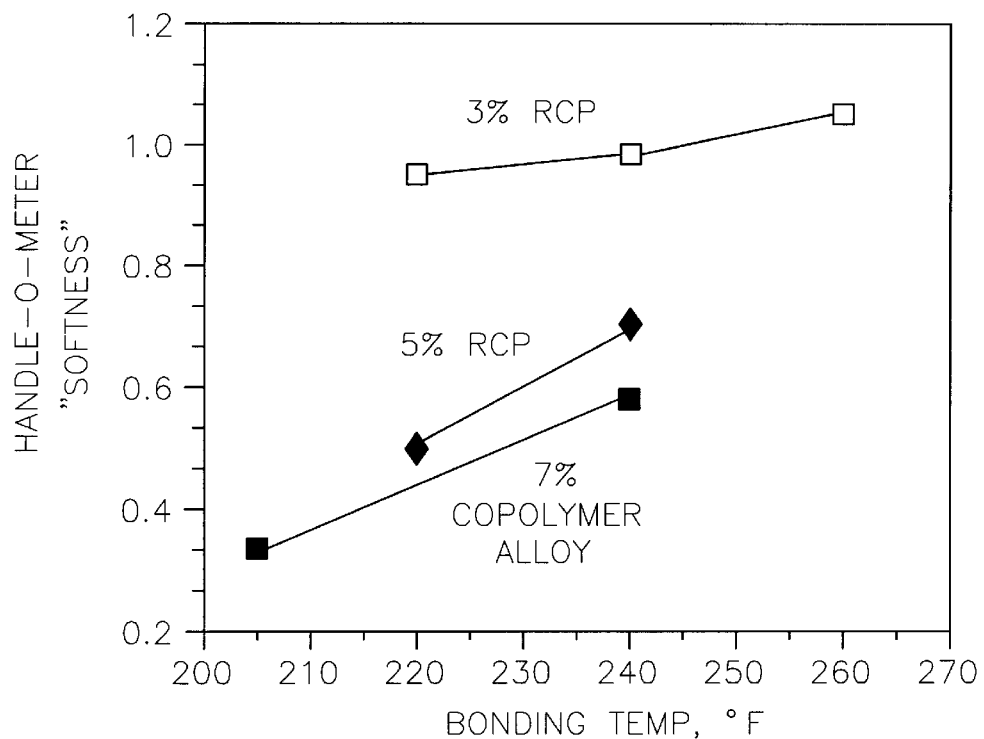
Fig. 6
TENACITY/ELONGATION COMPARISON
FOR 2.3 dpf FIBERS
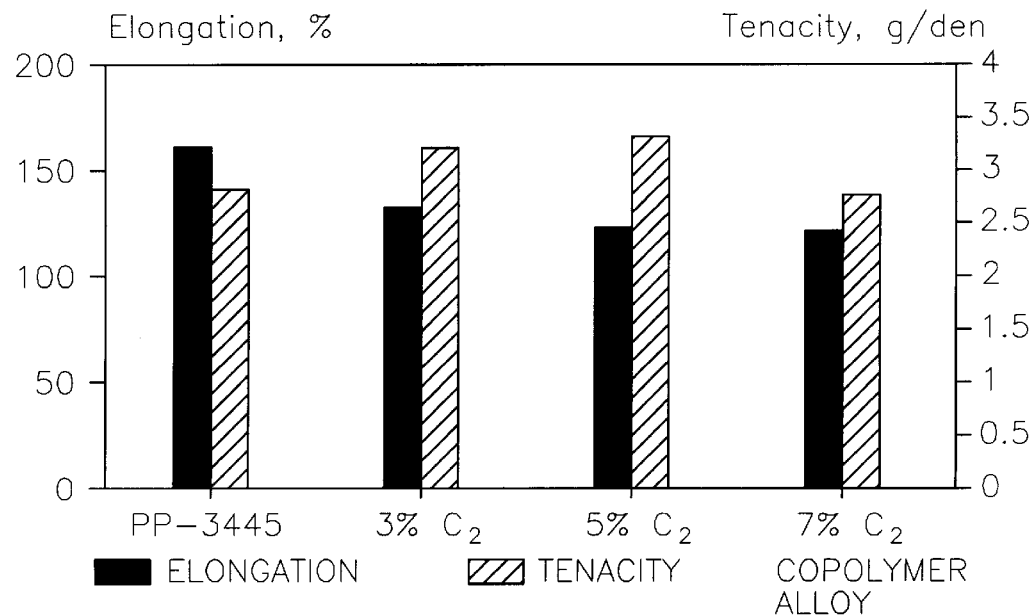

POLYPROPYLENE COPOLYMER ALLOYS AND PROCESS FOR MAKING

TECHNICAL FIELD

The present invention generally relates to polypropylene copolymer alloys, which are specially suited for soft fiber and fabric applications and a method for their production. An embodiment of the present invention, relates to ethylene-propylene copolymer alloys, comprising an ethylene-propylene random copolymer having an ethylene content of about 3.5% by weight in an amount of from about 40 to about 90% by weight of the alloy; and an ethylene-propylene bipolymer in an amount of from about 10 to about 60% by weight of the alloy, said bipolymer having an effective ethylene content that renders said bipolymer miscible with said random copolymer.

BACKGROUND OF THE INVENTION

Polypropylene is a well known article of commerce, and is utilized in a wide variety of applications which are well known to those of ordinary skill in the art. Polypropylene is utilized widely in many fiber, fabric, or similar product applications. However, it is generally deficient in applications that require high softness such as nonwoven fabrics for disposable garments and diapers. For such soft-end use fiber and fabric applications macromolecules with a statistical placement of propylene and ethylene monomer units (hereinafter random copolymers) have come into use since they can be processed into fibers and fabrics that exhibit improved softness and drape characteristics in comparison to fibers and fabrics made from homopolymer polypropylene.

Random copolymers are made by adding small amounts of ethylene in the reacting medium comprising propylene and a catalyst that is capable of randomly incorporating the ethylene monomer into the macromolecule chain, to thereby reduce the overall crystallinity and rigidity of the macromolecule. Random copolymers, because of their lower crystallinity and rigidity, are preferred over homopolymer polypropylene in fiber and fabric applications that require enhanced softness. However, a number of practical limitations have limited the application of random copolymers in soft-end fiber and fabric uses. One limitation has been the inability of polypropylene manufacturers to economically incorporate ethylene at levels generally above about 5% by weight of the random copolymer. Another limitation has been the inability of existing fiber and fabric processes to economically draw fine diameter fibers and good coverage fabrics from conventional high ethylene content random copolymers and in particular random copolymers having an ethylene content greater than about 3% by weight. Coverage is defined as weight of polymer per unit area of the fabric. It is often the most important fabric parameter, since it is related to the yield and, thus the area cost. These and other limitations will become apparent from the following discussion of a typical spunbond process.

Random copolymers have long been used in the making of nonwoven spunbonded fabrics. In a typical spunbond process a random copolymer resin in granular or pellet form is first fed into an extruder, wherein the resin simultaneously is melted and forced through the system by a heating melting screw. At the end of the screw, a spinning pump meters the melted polymer through a filter to a die (hereinafter the spinneret) having a multitude of holes (hereinafter capillaries) where the melted polymer is extruded under pressure through the capillaries into fibers. The fibers exiting the spinneret are being solidified and drawn into finer diameter fibers by high speed air jets. The solidified fibers are laid randomly on a moving belt to form a random fibrous, mesh-like structure known in the art as a fiber web. For optimum softness and drape characteristics, solidification of the fibers must occur before the fibers come into contact, in order to prevent the fibers form sticking together. This phenomenon, of the fibers sticking together, ultimately results in a more rigid and less soft fabric. After web formation, the web is then bonded to achieve its final strength by pressing it between two heated steel rolls (hereinafter the thermobond calender).

The ethylene content of the random copolymer that is used to make the fibers is one of the parameters that affect the softness feel and drape characteristics of the spunbonded fabric. It has long been recognized that softer spunbonded fabrics could be produced by raising the amount of ethylene content in the random copolymer. Generally the greater the ethylene content of the copolymer is, the less rigid and the more elastic each fiber becomes, thus imparting a softer feel characteristic to the fabric itself However, fibers made from random copolymers having increasingly higher ethylene content take longer to solidify with the result that they tend to stick together forming coarser fibers before solidification occurs. The result of this phenomenon is, inter alia, that the fabric's uniformity, coverage (basis weight per unit area) and drape/handle characteristics suffer. The fabric becomes more rigid and less soft. Although, this problem could perhaps be somewhat alleviated by lowering the throughput rate, to allow more time for these resins to solidify before they come into contact, it generally becomes uneconomical to process random copolymers having an ethylene content greater than about 3.5% by weight of the total polymer, because of the generally very low throughput rate required to prevent the fibers from sticking together.

Moreover, random copolymers having an ethylene content greater than about 5% by weight have not generally been feasible to be produced in liquid reactor or hybrid reactor technologies. The term "liquid reactor technology" as used herein encompasses slurry polymerization processes wherein polymerization is conducted in inert hydrocarbon solvents and bulk polymerization processes wherein polymerization is conducted in liquefied propylene. The term "hybrid reactor technology" as used herein refers to polymerization processes comprising one or more liquid reactor systems followed by one or more gas phase reactors. Liquid only and hybrid reactor systems account for the most part of polypropylene manufacturing capacity worldwide. In a liquid reactor system, the liquid hydrocarbon solubilizes the atactic portion of the polymer, the level of which is enhanced by the high incidence of ethylene monomer in the polymer chain. The atactic material is tacky and creates flowability problems in the downstream equipment as soon as the liquid hydrocarbon is vaporized. Because of this phenomenon, ethylene incorporation in the random copolymer is limited to a maximum of about 5% by weight, in a liquid reactor system. Above that level, tacky copolymer granules would agglomerate and/or stick to the metal walls of the process equipment generally resulting in the clogging thereof.

Processes employing hybrid reactor technology have been widely used in the production of thermoplastic olefin resins (hereinafter TPO), but generally not in the production of random copolymers. A typical TPO resin, as per U.S. Pat. Nos. 3,806,558, 4,143,099 and 5,023,300, comprises a first homopolymer or random copolymer component and a second rubber-like component known as an olefin copolymer elastomer. Generally, it has been a widely held belief, among persons skilled in the TPO art, that lowering the ethylene content of the elastomer component below about 30 to 40% by weight range would result in severe fouling and shutdown of the gas phase reactor. Thus, conventional, TPO resins albeit of a high ethylene content are generally not suitable for typical random copolymer applications such as fiber making, since the elastomer component of a TPO resin contains large amount of ethylene that renders it immiscible with the homopolymer or random copolymer portion.

Therefore, it has been highly desirable to develop a polypropylene based resin having high ethylene content which would allow the making of softer fibers and fabrics without the processing and physical drawbacks of conventional high ethylene random copolymers and TPO resins.

SUMMARY OF THE INVENTION

We have discovered polymer alloys that overcome the aforementioned problems. The alloys in their overall concept comprise two polyolefinic polymeric components that though distinct, are miscible with one another. The term "miscible" as used herein means that the invention copolymers show a substantially single glass transition temperature (hereinafter Tg) peak when subjected to Dynamic Mechanical Thermal Analysis (hereinafter DMTA). A single Tg peak is exemplified in FIG. 3 and it is to be contrasted with a dual or multi-hump curvature such as shown in FIG. 2. Each component can be a copolymer of (having two monomers), or a terpolymer of (having three monomers) or a multipolymer of (having multiple monomers), propylene with any of a number of comonomers selected from the group comprising $C_3$–$C_{20}$ alpha-olefins and/or $C_3$–$C_{20}$ polyenes.

An embodiment of the present invention, relates to an ethylene-propylene copolymer alloy which is particularly suited, inter alia, for the making of fibers and nonwoven spunbonded fabrics having exceptional softness at economically acceptable processing conditions. The term "copolymer alloy" as used herein refers to a copolymer comprising two or more polymeric components, wherein each polymeric component being a copolymer of propylene with ethylene or other alpha olefins and having a distinct ethylene composition. The copolymer components could be made either separately and then mixed into a single copolymer alloy using a conventional mixing technique or produced in a sequential stage polymerization scheme an embodiment of which is described below. Although, the invention is primarily described in terms of ethylene-propylene copolymer alloy embodiments it is to be understood that the same inventive concept may be employed in order to produce propylene copolymer alloys with other alpha olefins such as for instance 1-butene. Also terpolymer butene-ethylene-propylene alloys are within the scope of the present invention.

In an embodiment of the invention the copolymer alloy comprises a first ethylene-propylene copolymer said copolymer being a random copolymer having an ethylene content of from about 1.0 to about 5.0% by weight, in an amount of from about 40 to about 90% by weight of the alloy, and a second ethylene-propylene copolymer having an ethylene content of from about 6 to about 40% by weight, in an amount of from about 10 to about 60% by weight of the alloy. The ethylene-propylene copolymer alloy is further characterized in that the two copolymer components the alloy are miscible with one another. In contrast, TPO resins demonstrate at least two Tg peaks. The later TPO resins generally cannot be drawn into fibers.

In another embodiment of the present invention a terpolymer butene-ethylene-propylene alloy comprises an ethylene-propylene copolymer said copolymer being a random copolymer having an ethylene content of from about 1.0 to about 5.0% by weight, in an amount of from about 40 to about 90% by weight of the alloy, and a butene-ethylene-propylene terpolymer having a butene content of from about 1 to about 40% by weight, and an ethylene content of from about 5 to about 40% by weight, said terpolymer consisting of from about 10 to about 60% by weight of the alloy. The butene-ethylene-propylene terpolymer alloy of the present invention are further characterized in that all of its components are miscible with one another.

Another embodiment of the present invention, relates to a multi-reactor process for producing the invention copolymers. A particular embodiment of this process comprises: a first stage of polymerizing a mixture of ethylene and propylene in single or plural reactors, in the presence of a catalyst system capable of randomly incorporating the ethylene monomer into the macromolecules to form a random copolymer having an ethylene content of from about 1 to about 5% by weight in an amount of from about 40 to about 90% by weight of the alloy; and a second stage of then, in the further presence of the random copolymer containing active catalyst polymerizing a mixture of ethylene and propylene in single stage or in plural stages to form an ethylene-propylene copolymer having an ethylene content of from about 5 to about 40% by weight, in an amount of from about 10 to about 60% by weight of the alloy. A particular embodiment of the invention relates to a hybrid process having a first polymerization stage comprising of single or plural liquid reactors and a second polymerization stage comprising of single or plural gas phase reactors. Other embodiments of the present invention further relate to fibers and fabric articles made of the invention copolymer alloy and to methods of making these articles.

BRIEF DESCRIPTION OF THE DRAWINGS

These and other features, aspects, and advantages of the present invention will become better understood with regard to the following description, appended claims, and accompanying drawings where:

FIG. 5, shows the softness as a function of the bonding temperature of a non woven spunbonded fabric made from an embodiment of the present invention copolymer.

FIG. 6, shows the tenacity and elongation properties of fibers made using an embodiment of the present invention copolymer.

DETAILED DESCRIPTION OF THE INVENTION

Figure 1:
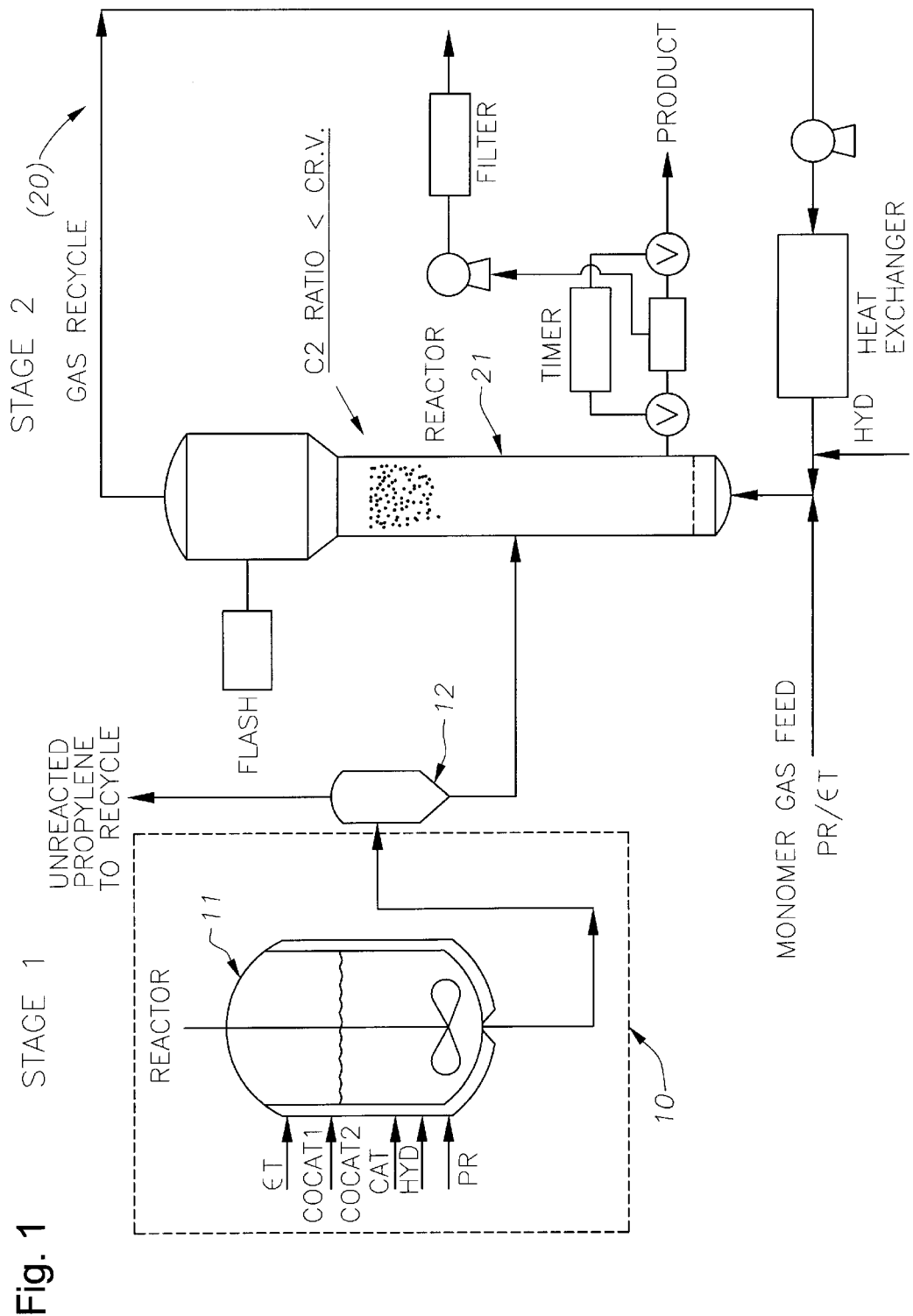
FIG. 1, is a diagram of a hybrid two reactor process embodiment of the present invention.

While the invention will be described in connection with preferred embodiments, it will be understood that it is not intended to limit the invention to those embodiments. On the contrary, it is intended to cover all alternatives, modifications and equivalents as may be included within the spirit and scope of the invention as defined by the appended claims.

Alloy Compositions
  Copolymer Alloys
  An embodiment of the invention broadly relates to a polymer alloy which is especially suited for soft-end use applications. The term polymer alloy as used herein refers to a polymer comprising two distinct but miscible polyolefinic multipolymers of propylene with at least one alpha-olefin and/or polyene. Generally, the alpha-olefins suitable for use in the invention include ethylene and those that contain in the range of about 2 to about 20 carbon atoms, preferably in the range of about 3 to about 16 carbon atoms, most preferably in the range of about 3 to about 8 carbon atoms. Illustrative non-limiting examples of such alpha olefins are ethylene, 1-butene, 1-pentene, 4-methyl-1-pentene, 1-hexene, 1-octene, 1-decene, 1-dodecene and the like. In one embodiment, the polyene is a diene, that has in the range of about 3 to 20 carbon atoms. Preferably, the diene is a straight chain, branched chain or cyclic hydrocarbon diene having from about 4 to 20 carbon atoms, preferably from about 4 to about 15 carbon atoms, and more preferably in the range of about 6 to about 15 carbon atoms. Examples of suitable dienes are straight chain acyclic dienes such as: 1,3-butadiene, 1,4-hexadiene and 1,6-octadiene; branched chain acyclic dienes such as: 5-methyl-1,4-hexadiene, 3,7-dimethyl-1,6-octadiene, 3,7-dimethyl-and dihydrooinene; single ring alicyclic dienes such as: 1,3-cyclopentadiene, 1,4-cyclohexadiene, 1,5-cyclooctadiene and 1,5-cyclododecadiene; and multiring alicyclic fused and bridged ring dienes such as: tetrahydroindene, methyl tetrahydroindene, dicyclopentadiene, bicyclo-(2,2,1)-hepta-2-5-diene; alkenyl, alkylidene, cycloalkenyl and cycloalkylidene norbornenes such as 5-methylene-2-norbornene, 5-propenyl-2-norbornene 5-isopropylidene-2-norbornene, 5-(4-cyclopentenyl)-2-norbornene, 5-cyclohexylidene-2-norbornene, 5-vinyl-2-norbornene and norbornene. Particularly preferred dienes are 1,4-hexadiene, 5-ethylidene-2-norbornene, 5-vinylidene-2-norbornene, 5-methyl-2-norbornene, and dicyclopentadiene. Especially preferred dienes are 5-ethylidene-2-norbornene and 1,4-hexadiene.

A particular embodiment relates to an ethylene-propylene copolymer alloy comprising a first ethylene-propylene copolymer said first copolymer being a random copolymer and a second ethylene-propylene copolymer, wherein the ethylene content of the second copolymer is lower than a critical value to impart miscibility between the two copolymers. For sake of clarity, the second ethylene-propylene copolymer will be referred hereinafter as "bipolymer" to distinguish it from the first copolymer component. We have discovered that if the ethylene content of the bipolymer is kept below about 40% by weight, then the copolymer alloy of this bipolymer with a random copolymer has a substantially single Tg peak and more importantly allows the making of fibers and fabrics having exceptional softness, generally without the processability problems associated with high in ethylene random copolymers, or TPO resins. The relative amounts of the two components in the alloy may vary. The random copolymer component of the alloy may have an ethylene content of from about 0.1 to about 6.0% by weight, but preferably should be kept within the range of from about 1 to about 5% by weight and most preferably of from about 3 to about 4% by weight. Its molecular weight and molecular weight distribution may vary within a wide range.

Generally, the ethylene content of the bipolymer component may vary from above about 6 to about 40% by weight. The exact upper limit of the ethylene content in the bipolymer will be defined as the point at which the bipolymer ceases to be miscible with the random copolymer component. It is understood that at ethylene levels of about 5% by weight and or lower the bipolymer is in effect a random copolymer. Blends of random copolymers having varying ethylene composition up to about 5% by weight are well known in the art and are outside the scope of the invention copolymer alloy. Ethylene-propylene copolymers having an ethylene content of from about 6 to about 12% by weight are also often times referred to as random copolymers, however, they begin to exhibit increased levels of blocky, crystalline ethylene. It is preferred, for purposes of the present invention, that the ethylene content of the bipolymer be kept within the range of from about 10 to about 30% by weight of the bipolymer. For optimum results the ethylene content of the bipolymer should be kept within the range of from about 10 to about 20% by weight of the bipolymer.

There are a number of structural variables which affect the ultimate properties of the alloy. These structural variables are important in the sense that they can define the exact ultimate properties of the alloy and may be tailored to meet the requirements of a particular application. Two of the most important are the overall ethylene content and molecular weight of the copolymer alloy. The overall ethylene content of the alloy is the primary factor determining the softness of the various articles made from the alloy and may vary within a wide range from about 3.5% to about 30% depending upon the required softness for the particular end-use. For fiber applications the overall ethylene content is preferably from about 5% to 15% and most preferably from about 6 to 8% by weight of the alloy. The molecular weight (MW) of the copolymer alloy determines its melt viscosity and ultimate desirable physical properties. The MW of the alloy as determined by the MFR test (ASTM D1238, Condition L) may vary within a wide range from fractional to about 1000 g/10 minutes, preferably between about 3 to about 100 g/10 minutes and most preferably between about 25 to about 65 g/10 minutes. Another important structural variable the molecular weight distribution (MWD) of the alloy may also vary within a wide range, but a generally narrow overall MWD is preferred for fiber applications. MWD plays a role in melt processability as well as the level and balance of physical properties achievable. The MWD may vary from extremely narrow (as in a polydispersity, Mw/Mn, of about 2, obtained using metallocene catalysts), to broad (as in a polydispersity of about 12). A polydispersity in the range of from about 2 to about 6 is preferred and a polydispersity in the range of from about 2 to about 4 is most preferred. Another variable, the composition distribution refers to the distribution of comonomer between the alloy's molecules. The overall structural variables of the alloy depend upon the structural variables of each of the alloy components and the weight of each of the components in the alloy.

The random copolymer component may have an ethylene content of from fractional to about 5% by weight, a MFR of from fractional to about 1000 g/10 minutes, a composition distribution ranging from very narrow (as in the case of metallocene made random copolymers wherein almost every molecule has almost the same content of ethylene comonomer) to broad (as in the case of typical Ziegler-Natta catalyst systems), a MWD of from very narrow (polydispersity of about 2 as in the case of metallocene made random copolymers) to broad (polydispersity of from about 3 to about 8 as in the case of Ziegler-Natta catalyst systems) to extremely broad (polydispersity of from about 8 to about 50). The above structural variables of the random copolymer may be controlled with a number of well known in the art methods including catalyst selection and/or use of multiple reactors in series.

The bipolymer component may have an ethylene content of from 6% to about 40% by weight, a MFR of from fractional to about 1000 g/10 minutes, a composition distribution ranging from very narrow (as would be the case with metallocene made bipolymers wherein each molecule has almost the exact same ethylene content) to broad (as in the case of typical Ziegler-Natta catalyst systems), a MWD of from very narrow (polydispersity of about 2 as in the case of metallocene made random copolymers) to broad (polydispersity of from about 3 to about 8 as in the case of Ziegler-Natta catalyst systems) to extremely broad (polydispersity of from about 8 to about 50). The above structural variables of the random copolymer may be controlled with a number of well known in the art methods including catalyst selection and/or use of multiple reactors in series. The ethylene content of the bipolymer should preferably be from about 10 to 30% by weight and most preferably from about 10 to about 20% by weight. The ethylene content of the bipolymer is critical in insuring the miscibility of the two components which in turn renders the alloy suitable for applications such as fiber spinning, where resins hitherto existing present processing problems because of their immiscible, two phase regime. Also, the ratio of the bipolymer MFR over the random copolymer MFR may vary within a wide range but should preferably be maintained within the range of from about 0.1 to 10, and most preferably of from about 0.5 to about 5.0.

A particular embodiment of the invention alloy comprises an ethylene-propylene random copolymer having an ethylene content of from about 1.0 to about 5.0% by weight, in an amount of from about 60 to about 80% by weight of the alloy; and an ethylene-propylene bipolymer having an ethylene content of from about 10 to 40% by weight, in an amount of from about 20 to 40% by weight of the alloy. An ethylene-propylene copolymer alloy comprising an ethylene-propylene random copolymer having an ethylene content of from about 2.0 to about 4.0% by weight, in an amount of from about 60 to 80% by weight of the alloy; and an ethylene-propylene bipolymer having an ethylene content of from about 10 to 25% by weight, in an amount of from about 20 to 40% by weight of the alloy, is a preferred embodiment. An ethylene-propylene copolymer alloy comprising an ethylene-propylene random copolymer having an ethylene content of from about 2.5 to 3.5% by weight, in an amount of from about 65 to 75% by of the alloy; and an ethylene-propylene bipolymer having an ethylene content of from about 10 to 20% by weight, in an amount of from about 25 to 35% by weight of the alloy, is the most preferred embodiment.

Figure 3:
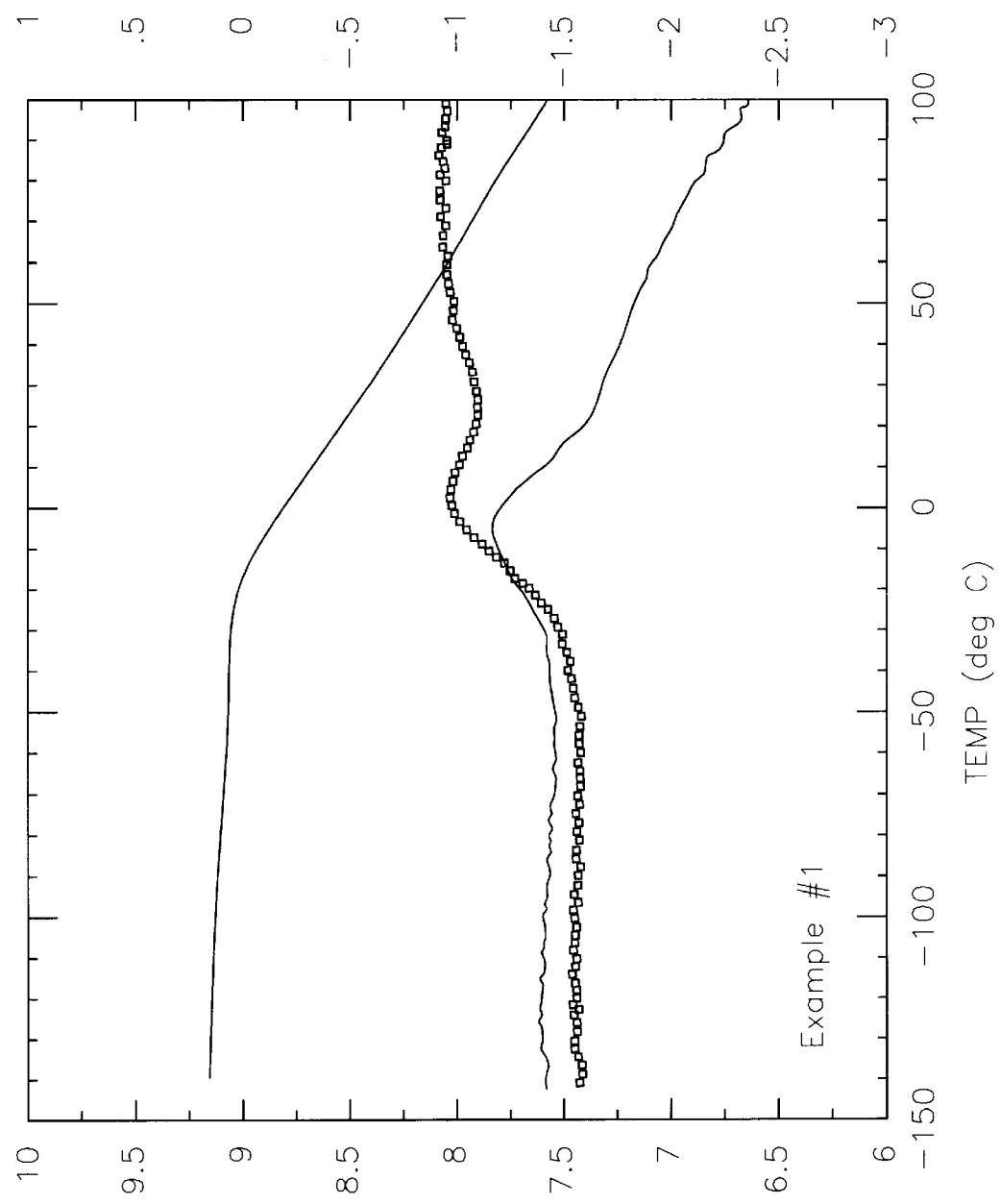
FIG. 3, is a DMTA analysis of an embodiment of the present invention copolymer.
Figure 4:
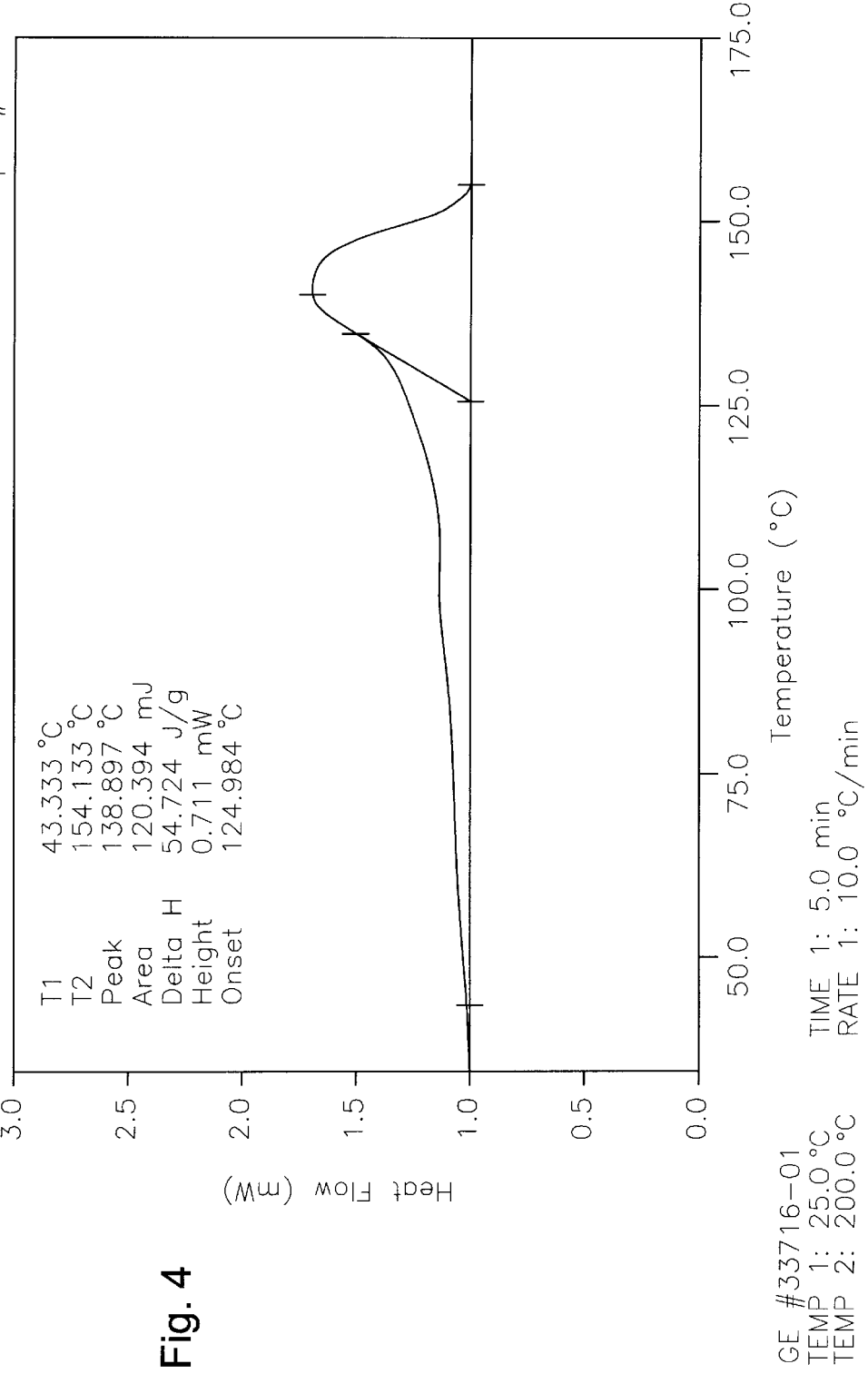
FIG. 4, shows the melting point, as measured by Differential Scanning Calorimeter (DSC) analysis, of an embodiment of the present invention copolymer.

These ethylene-propylene copolymer alloy embodiments are further characterized in that the random copolymer and bipolymer components are essentially miscible with one another, as exemplified by the substantially single Tg peak obtained by DMTA analysis (FIG. 3). The DMTA on the injection molded samples were run on Polymer Laboratories Mark II instrument. Samples were run in uniaxial extension configuration from −100 to 160° C. at a heating rate of 2° C./minute and at 1 or 10 Hz frequency. The data plotted were analyzed for storage, loss modulus and tan delta. These alloys are processed into fiber and nonwoven fabric articles having excellent softness, under generally improved processing conditions as described more in detail below.

Figure 2:
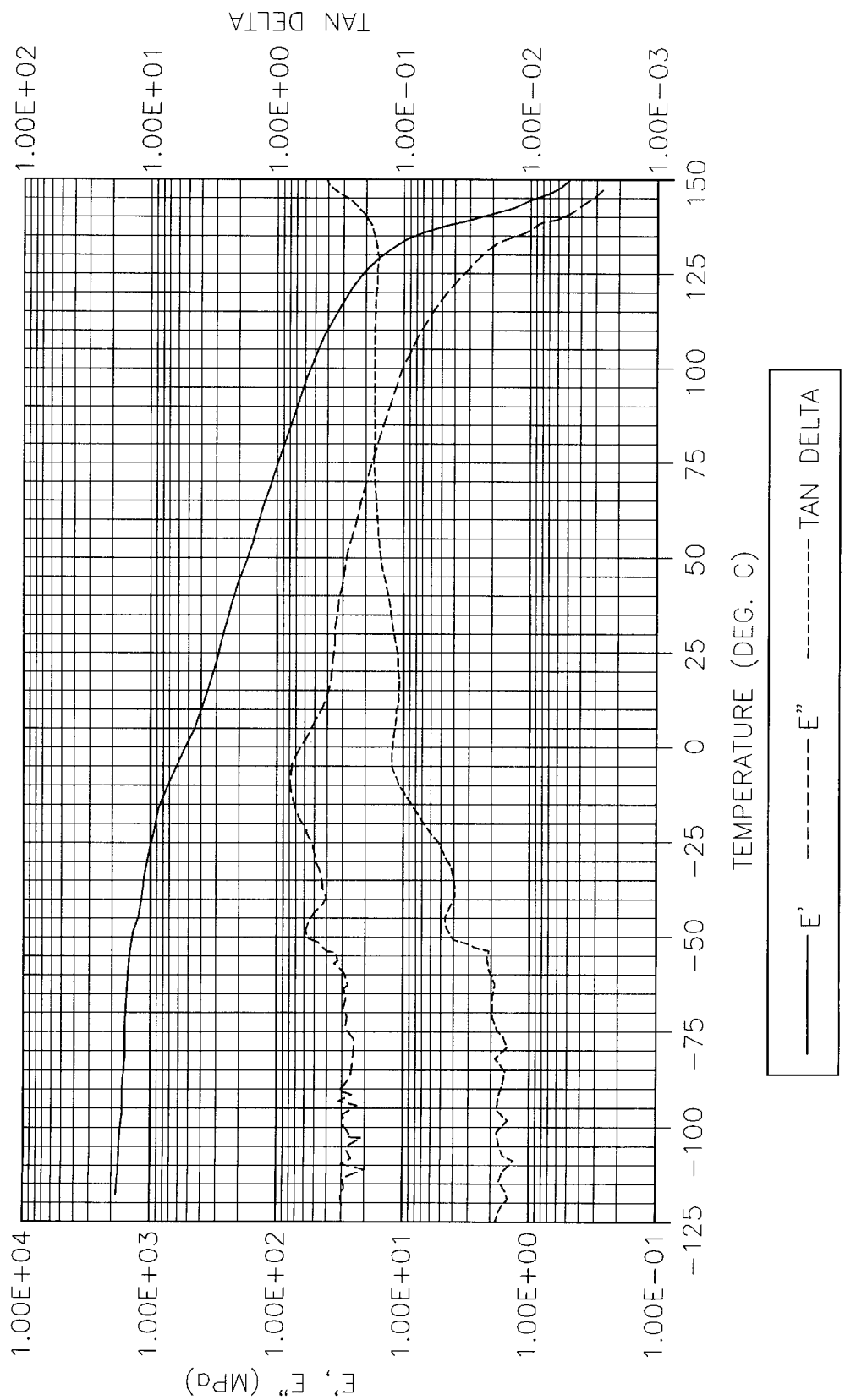
FIG. 2, is a DMTA analysis of a conventional reactor TPO resin.

In contrast, conventional TPO resins consisting of greater than about 40% by weight ethylene in the bipolymer cannot generally be spun into very soft fiber or fabric articles. For instance, the DMTA analysis of a typical TPO resin produced according to the teachings of U.S. Pat. No. 5,023,300, shows the immiscible nature (two well discernible Tg peaks) of its random copolymer and rubber components. (See FIG. 2). This resin, consisting of a random copolymer having an ethylene content of about 3% by weight and a bipolymer component having an ethylene content of about 55% by weight, exhibits two distinct glass transition temperatures—one Tg at about 0° C. and one Tg at −50° C.—which are indicative of the immiscibility of the two components.

Terpolymer Alloys

In another embodiment of the present invention a terpolymer butene-ethylene-propylene alloy comprises an ethylene-propylene copolymer said copolymer being a random copolymer having an ethylene content of from about 1.0 to about 5.0% by weight, in an amount of from about 40 to about 90% by weight of the alloy, and a butene-ethylene-propylene terpolymer having a butene content of from about 1 to about 40% by weight, and an ethylene content of from about 5 to about 40% by weight, said terpolymer consisting of from about 10 to about 60% by weight of the alloy. The butene-ethylene-propylene terpolymer alloy of the present invention are further characterized in that all of its components are miscible with one another.

In another embodiment of the present invention a terpolymer butene-ethylene-propylene alloy comprises two butene-ethylene-propylene terpolymers. The first butene-ethylene-propylene terpolymer can have an ethylene content of from about fractional to about 5.0% by weight, and a butene content of from about fractional to about 5% by weight, preferably an ethylene content of from about 1 to about 4.0% by weight, and a butene content of from about 1 to about 4% by weight, and most preferably an ethylene content of from about 2 to about 4.0% by weight, and a butene content of from about 2 to about 4% by weight. The second terpolymer component can have an ethylene content of from about fractional to about 60% by weight, and a butene content of from about fractional to about 60% by weight, preferably an ethylene content of from about 10 to about 40% by weight, and a butene content of from about 5 to about 30% by weight, and most preferably an ethylene content of from about 10 to about 30% by weight, and a butene content of from about 5 to about 20% by weight. The amount of each component in the mixture may vary widely depending upon the ultimate balance of properties that are required for a particular application.

The first component of a terpolymer alloy may have a MFR of from fractional to about 1000 g/10 minutes, a composition distribution ranging from very narrow (as in the case of metallocene made terpolymers wherein almost every molecule should have almost the same content of ethylene and butene comonomer) to broad (as in the case of typical Ziegler-Natta catalyst systems), a MWD of from very narrow (polydispersity of about 2 as would be the case of metallocene made terpolymers) to broad (polydispersity of from about 3 to about 8 as in the case of Ziegler-Natta catalyst systems) to extremely broad (polydispersity of from about 8 to about 50). The above structural variables of the first terpolymer component of the alloy may be controlled with a number of well known in the art methods including catalyst selection and/or use of multiple reactors in series.

The second component of the terpolymer alloy may have a MFR of from fractional to about 1000 g/10 minutes, a composition distribution ranging from very narrow (as would be the case with metallocene made terpolymers) to broad (as in the case of typical Ziegler-Natta catalyst systems), a MWD of from very narrow (polydispersity of about 2 as in the case of metallocene made terpolymers) to broad (polydispersity of from about 3 to about 8 as in the case of Ziegler-Natta catalyst systems) to extremely broad (polydispersity of from about 8 to about 50). The above structural variables of the second component of the terpolymer alloy may be controlled with a number of well known in the art methods including catalyst selection and/or use of multiple reactors in series. The ethylene and butene content of the second component is critical in insuring the miscibility of the two components which in turn renders the alloy suitable for applications such as fiber spinning, where resins hitherto existing present processing problems because of their immiscible, two phase regime. Also, the ratio of the second component MFR over the first component's MFR may vary within a wide range but should preferably be maintained within the range of from about 0.1 to 10, and most preferably of from about 0.5 to about 5.0.

Process for Making the Invention Alloys

A second object of the invention, relates to a process for producing these ethylene-propylene copolymer alloys. An embodiment of the process invention comprises: 1) a first step of polymerizing a mixture of ethylene and propylene in single or plural reactors in the presence of a catalyst to form an ethylene-propylene random copolymer having an ethylene content of from about 1 to about 5% by weight in an amount of from about 40 to 90% by weight of the alloy; and 2) a second step, in the further presence of catalyst containing random copolymer, polymerizing a mixture of ethylene and propylene in single or in plural reactors to form an ethylene-propylene bipolymer having an ethylene content of from about 6 to 40% by weight, in an amount of from about 10 to 60% by weight of the alloy. In a particular embodiment of this process, the first polymerization step is conducted in a pipe loop reactor and the second polymerization step is conducted in a gas phase reactor. In another embodiment of this invention bipolymer can be incorporated first.

The invention embodiments of Table 1, are made in a two-stage multi-reactor process, comprising a first stage having two stirred tank auto-refrigerated bulk liquid reactors in series operation and a second stage comprising a single gas phase fluidized bed reactor. A propylene auto-refrigerated reactor operates at the liquid-vapor equilibrium of propylene. The heat of polymerization is primarily removed by the vaporization and subsequent condensation of propylene. A small, about 10° F. temperature differential is maintained between the first and second reactors. Ethylene and hydrogen concentrations in each reactor are controlled to obtain the desired ethylene incorporation and MFR. Reactor pressure floats with the reactor temperature and the ethylene and hydrogen concentrations in the vapor space of the reactor.

The alloys utilized in the present invention may be made by any suitable catalyst which allows for proper control of the above mentioned structural characteristics. One possible method is through the use of highly active olefin polymerization catalysts known as Ziegler-Natta catalysts. Catalysts of the Ziegler-Natta type, i.e., catalysts comprising titanium halides supported on an inert carrier such as magnesium chloride, organoaluminum compounds and electron donor compounds, are well known and are described in U.S. Pat. Nos. 4,115,319, 4,978,648, 4,657,883 which are incorporated herein for purposes of US practice. Also known is incorporating an electron donor compound into the titanium-containing component. An olefin polymerization system typically comprises a solid titanium containing compound, an alkylaluminum compound known in the art as a cocatalyst and an electron donor external modifier compound. The external electron donor is distinct from the electron donor which may be incorporated with the titanium containing solid compound.

Illustrative examples of Ziegler-Natta type solid catalyst components, include magnesium-containing, titanium compounds such as those commercially known with the trade name FT4S and HMC-101 and which are supplied by Himont Inc. Another possible catalyst component of use in this invention is the TK catalyst component, a proprietary titanium halide-based magnesium chloride-containing catalyst component produced commercially by AKZO Chemicals Inc. Another possible, catalyst component is described in U.S. Pat. No. 4,540,679 which is incorporated herein for purposes of U.S. practice. It is to be understood that the these possible solid components listed above are illustrative and that the present invention is in no way limited to any specific supported Ziegler-Natta type catalyst or catalyst component.

The chemicals methyl-cyclohexyldimethoxy silane (MCMS) and tri-ethyl-aluminum (TEAL) may be used as external electron donor and cocatalyst, respectively, both during prepolymerization and main polymerization at typical concentrations. The concentration of MCMS may vary from 10 to 100 in weight ppm per total propylene feed in the lead reactor. At a concentration lower than 10 weight ppm the polymer may become tacky while at a concentration greater than 100 the overall catalyst efficiency is significantly reduced. A concentration of MCMS from 30 to 60 weight ppm is preferred for optimum results. Many other electron donors or mixtures thereof may be utilized. Examples of suitable electron compounds include aliphatic and aromatic silanes such as the ones described in U.S. Pat. Nos. 4,540,679, 4,420, 594, 4,525,55, 4,565,798 and 4,829, 038.

TEAL concentration can vary from about 50 to 400 weight ppm per total propylene feed in the lead reactor. At concentrations less than 50 ppm the catalyst efficiency suffers while at concentrations greater than 400 ppm the effect of TEAL is insignificant. A concentration of TEAL of from about 80 to about 150 is preferred for optimum results. Many other alkylaluminum compounds or mixtures thereof may also be used as cocatalyst. Additional amounts of donor and cocatalyst can be added in the second stage to increase the catalyst activity and improve the flowability of the polymer particles. Prepolymerization is optional and may be performed either in a batch process or preferably in continuous process mode. It is further understood that the concept of this invention should equally be applicable using a number of other Ziegler-Natta type catalyst systems disclosed in the art. Possible internal modifiers are described in U.S. No. Pat. 5,218,052, which is incorporated herein for purposes of U.S. practice.

Another suitable method is through the use of a class of highly active olefin polymerization catalysts known as metallocenes. A metallocene catalyst would be preferred since it would allow the production of a copolymer alloy having an MFR in the range of from about 35 to about 2000 g/10 minutes with a very narrow MWD in the reactor system thus eliminating the need for post reactor oxidative degradation of the alloy.

Looking at the simplified flow diagram of FIG. 1, liquid propylene (PR), ethylene gas (ET), a catalyst (CAT), an organoaluminum compound (COCAT1), an electron donor (COCAT2) and hydrogen (HYD) are fed into the lead reactor 11 of the first Stage 10 to produce the desired ethylene-propylene random copolymer having an ethylene content ranging from about 1 to about 5% by weight. Hydrogen is fed into the first stage reactor(s) to control the melt flow rate (MFR) of the random copolymer resin. The exact amount of hydrogen needed to obtain a desired MFR depends on the exact catalyst combination and the ethylene incorporation. The ratio of ethylene to propylene in the feed controls the ethylene content of the random copolymer. Although the process conditions needed for making the aforementioned random copolymers are well known, for the sake of clarity, the general typical ranges for the invention are recited below. These ranges should not be construed as limiting the scope of the present invention in any way.
First Stage Reactor Conditions
Catalyst: FT4S for examples 1&2 and
HMC-101 for examples 3–5
Donor: MCMS
Alkyl: TEAL
First Reactor temperature, 130–160 F.
Pressure, 400–500 psig
Residence Time, 0.5–3.0 hrs
Hydrogen, 0.1–0.35 mole %
Ethylene, 1.0–2.2 mole %
Second Reactor temperature, 120–150 F.
Pressure, 380–480 psig
Residence Time, 0.5–3.0 hrs
Hydrogen, 0.1–0.35 mole %
Ethylene, 1.0–2.2 mole %

The random copolymer product of the first Stage, is then transferred through a series of monomer disengaging devices, well known to those skilled in the art, and the resulting product in granular form is then fed to a gas phase fluidized bed reactor 21 for the second Stage 20 processing. The gas phase reactor can be any of a number of well-known fluidized bed type reactors disclosed in U.S. Pat. Nos. 4,543,399; 4,588,790; 5,028,670; 5,382,638; and 5,352,749, hereby incorporated in this application by reference for purposes of U.S. patent practice. Propylene and ethylene fed into the gas phase reactor of the second Stage are polymerized in the presence of the active catalyst containing random copolymer granules fed from the first Stage. Hydrogen is also fed in order to regulate the molecular weight of the bipolymer i.e. the copolymer made in said gas phase reactor. Additional donor could be utilized if required for better powder flowability. Also, additional cocatalyst could be added to augment the catalyst activity, if needed. The ethylenepropylene gas mole ratio (C2 Ratio) in the gas phase reactor should be controlled at or below a critical value (Cr. v.) in order to ensure that the bipolymer and random copolymer phases are miscible. The critical value is expected to vary somewhat with the catalyst system and process conditions. The ethylenepropylene gas mole ratio in the gas phase reactor should be adjusted until the DMTA analysis of the copolymer alloy thus made shows substantially a single peak. For the particular embodiments of Table 1 the critical value of the ethylenepropylene gas mole ratio was found to be around 0.35. A gas mole ratio in the range of 0.10–0.25 is preferred. A gas mole ratio in the range of 0.15–0.20 is most preferred. For the catalyst utilized in the aforementioned examples the second stage reactor condition ranges are provided herein, for the sake of clarity.
Second Stage Reactor Conditions
Gas Phase Reactor temperature, 140–170 psig
Pressure, 100–180 psig
Residence Time, 0.2–3.0 hrs
EthylenePropylene Gas Mole Ratio 0.10–0.35

A preferred embodiment of the present invention employs two liquid pipe loop reactors in series in the first stage. Pipe loop reactors are recirculating, jacketed pipe reactors, similar to those disclosed in U.S. Pat. Nos. 3,437,646; 3,732,335; 3,995,097; 4,068,054; 4,182,810; and 4,740,550, all incorporated herein by reference for purposes of US patent practice. The pressure is maintained sufficiently high to suppress propylene vaporization. As an illustrative example, the temperature and pressure might be set at 160° F. and 500 psig respectively. The heat of polymerization is removed by a cooling water jacket.

In an embodiment of the present invention butene may be introduced in addition to the propylene and ethylene monomers in both or one of the two stages to produce a butene-ethylene-propylene alloy comprising two components, the first component being a polymer selected from the group consisting of ethylene-propylene random copolymers, butene-propylene random copolymers, and butene-ethylene-propylene terpolymers, the second component being a polymer selected from the group consisting of ethylene-propylene random copolymers, butene-propylene random copolymers, and butene-ethylene-propylene terpolymers, wherein said two components are distinct but miscible.

Fibers Made from the Invention Copolymer Alloys

Another object of this invention is the preparation of fibers made from the copolymer alloys. An ethylene-propylene copolymer prepared as explained above, is then subjected to a controlled rheology (CR) process well known in the art, whereby the copolymer is visbroken into a resin having a narrower molecular weight distribution and lower average molecular weight in order to facilitate fiber spinning. The molecular weight (MW) of the visbroken copolymer alloy determines the level of melt viscosity and the ultimate desirable physical properties of the fiber. The MW of the visbroken alloy as determined by the MFR test (ASTM D1238, Condition L) may vary within a wide range from fractional to about 1000 g/10 minutes, preferably between about 3 to about 100 and most preferably between about 25 to about 65. The MWD of the visbroken alloy may also vary within a wide range, but a generally narrow overall MWD is preferred for fiber applications. MWD plays a role in melt processability as well as the level and balance of physical properties achievable. The MWD of the visbroken alloy may vary from extremely narrow (as in a polydispersity, Mw/Mn, of about 2), to broad (as in a polydispersity of about 12). A polydispersity in the range of from about 2 to about 6 is preferred and a polydispersity in the range of from about 2 to about 4 is most preferred. The CR process may also convert the polymer granules to pellets for easier feeding into the fiber spinning extruder. Additives such as stabilizers, pigments, fillers, antioxidants, ultra-violet screening agents, nucleating agents, certain processing oils and the like may optionally be added; however, this should not be considered a limitation of the present invention. CR processes are described in U.S. Pat. No. 4,143,099 and are incorporated herein by reference for purposes of U.S. practice.

The copolymer alloy is then drawn to a fine diameter fiber by one of several well known in the art modifications of the basic melt-extrusion fiber process. This process consists of the steps of: (1) continuously feeding the copolymer alloy to a melting screw extruder; (2) simultaneously melting and forcing the copolymer alloy through a spinneret whereby the alloy is extruded into fibers under pressure through holes that, depending upon the desired fiber product, may vary widely in number, size and shape; (3) solidifying the fibers by transferring the heat to a surrounding medium; and (4) winding of the solidified fibers onto packages. Further processing typically includes orienting the fibers by drawing it to many times its original length. Also, a variety of thermal and texturing treatments well known in the art may be employed, depending on the desired final properties of the fiber. Embodiments of the present invention copolymer alloy are drawn into fine diameter fibers at generally high draw-down speed, without the individual fibers sticking together below the crystallization point.

Although the terms of "draw-down speed" and "crystallization point" are well known among those skilled in the art, a brief explanation is provided herein in the interest of clarity. The draw-down speed is measured by extruding the polymer through a capillary at a given rate throughout, typically 0.3–1.2 g/hole/min. The take up speed of the fiber is increased until the fibers break. The maximum take up speed at which the fiber breaks is defined as the draw-down speed. For effective spinning in a spunbond process, a resin should have at least 1,000 meter/minutes of draw-down speed capability. Homopolymer and conventional random copolymer resins used in spunbond applications are processed at a draw-down speed of from about 1,000 to about 5,000 meters per minute. TPO resins are generally not used in fiber spinning because of their poor processing characteristics. Also, fibers made from TPO resins would be stiff and result in low coverage nonwoven fabrics as it is explained below. The draw-down capability of such a resin would be less than about 1,000 meters per minute.

The crystallization point is the point at some distance below the spinneret where the fibers solidify. Fibers made from the resin of the present invention crystallize faster than corresponding conventional random copolymers i.e. random copolymers having the same ethylene content. This characteristic in combination of their overall high ethylene content results in the making of fabrics having exceptional balance of softness, spinning capability, and physical properties. Fibers prepared from embodiments of the present invention copolymer alloy exhibit excellent characteristics (see FIG. 6). Tensile strength is comparable to that of polypropylene. Moreover the fiber is more flexible and feels softer.

Spunbonded Fabrics from Invention Copolymer Alloys

A particular embodiment of the present invention involves the use of the invention copolymer alloys in the making of spunbonded fabrics. Conventional spunbond processes are illustrated in U.S. Pat. Nos. 3,825,379; 4,813,864; 4,405,297; 4,208,366; and 4,334,340 all hereby incorporated by reference for purposes of U.S. patent practice. The spunbonding process is one which is well known in the art of fabric production. Generally, continuous fibers are extruded, laid on an endless belt, and then bonded to each other, and often times to a second layer such as a melt blown layer, often by a heated calendar roll, or addition of a binder. An overview of spunbonding may be obtained from L. C. Wadsworth and B. C. Goswami, Nonwoven Fabrics: "Spunbonded and Melt Blown Processes" proceedings *Eight Annual Nonwovens Workshop*, Jul. 30–Aug. 3, 1990, sponsored by TANDEC, University of Tennessee, Knoxville, Tenn.

A typical spunbond process consists of a continuous filament extrusion, followed by drawing, web formation by the use of some type of ejector, and bonding of the web. First, the invention ethylene-propylene copolymer alloy is visbroken using peroxide into a resin having a narrower molecular weight distribution and about 35 MFR. During this step the polymer granules are converted into pellets. The pelletized 35 MFR ethylene-propylene copolymer resin is then fed into an extruder. In the extruder, the pellets simultaneously are melted and forced through the system by a heating melting screw. At the end of the screw, a spinning pump meters the melted polymer through a filter to a spinneret where the melted polymer is extruded under pressure through capillaries, at a rate of 0.3–1.0 grams per hole per minute. The spinneret contains a few hundred capillaries, measuring 0.4–0.6 mm in diameter. The polymer is melted at about 30° C.–50° C. above its melting point to achieve sufficiently low melt viscosity for extrusion. The fibers exiting the spinneret are quenched and drawn into fine fibers measuring 10–40 microns in diameter by cold, 1000–6000 m/minutes velocity air jets. The solidified fiber is laid randomly on a moving belt to form a random netlike structure known in the art as web. After web formation the web is bonded to achieve its final strength using a heated textile calender known in the art as thermobond calender. The calender consists of two heated steel rolls; one roll is plain ant the other bears a pattern of raised points. The web is conveyed to the calender wherein a fabric is formed by pressing the web between the rolls at a a bonding temperature of about 130° C.–150° C.

While bonding occurs within a wide temperature range the bonding temperature must be optimized for achieving a fabric having maximum mechanical strength. Overbonding, that is, bonding at a temperature greater than optimum results in fibers having significantly weaker fiber around the bonding point because of excessive melting of the fiber. These become the weak points in the fabric. Underbonding, that is, bonding at a temperature lower than the optimum results in insufficient bonding at the fiber-to-fiber links. The optimum bonding temperature depends upon the nature of the material that the fibers are made of Spunbond fabrics produced using the ethylene-propylene copolymer alloys of the present invention exhibit a surprisingly good balance of softness and mechanical strength. Moreover, their optimum bonding temperature is lower than that of conventional random copolymers, thus permitting less expensive processing. (See FIG. 5). Note that all copolymers were melt spun at the same low draw-down speed in order to allow for a meaningful comparison.

Softness or "hand" as it is known in the art was measured using the Thwing-Albert Handle-O-Meter (Model 211-10-B/AERGLA). The quality of "hand" is considered to be the combination of resistance due to the surface friction and flexibility of a fabric material. The Handle-O-Meter measures the above two factors using an LVDT (Linear Variable Differential Transformer) to detect the resistance that a blade encounters when forcing a specimen of material into a slot of parallel edges. A 3½ digit digital voltmeter (DVM) indicates the resistance directly in grams. The "hand" of any given sheet of material is the average of four readings taken on both sides and both directions of a test sample and is recorded in grams per standard width of sample material.

EXAMPLES 1–5

Copolymer Alloys

In order to provide a better understanding of the present invention including representative advantages thereof, particular embodiments of the present invention copolymer alloy containing a varying ethylene content in the bipolymer are provided in Table 1 herein. These examples are not in any way intended as a limitation on the scope of the invention.

TABLE 1

EXAMPLES OF ETHYLENE-PROPYLENE COPOLYMER ALLOYS

| EXAMPLES # | 1 | 2 | 3 | 4 | 5 |
|---|---|---|---|---|---|
| RANDOM COPOLYMER | | | | | |
| MFR (G/10 MIN) | 2.4 | 1.0 | 2.3 | 2.5 | 2.0 |
| C2 (WT %) | 3.4 | 3.1 | 3.3 | 1.1 | 3.0 |

TABLE 1-continued

EXAMPLES OF ETHYLENE-PROPYLENE COPOLYMER ALLOYS

| EXAMPLES # | 1 | 2 | 3 | 4 | 5 |
|---|---|---|---|---|---|
| BIPOLYMER | | | | | |
| C2 (in Bipolymer wt. %) | 9.9 | 12.8 | 25 | 25 | 25 |
| BIPOLYMER (WT %) | 36 | 35.8 | 24 | 15.6 | 24 |
| BIPOLYMER MFR (G/10 MIN) | 10.6 | 0.75 | 0.65 | 1.30 | 1.0 |
| COPOLYMER ALLOY | | | | | |
| MFR (G/10 MIN) | 4.1 | 0.9 | 1.7 | 2.8 | 1.7 |
| C2 (WT %) | 7.0 | 7.7 | 8.3 | 5.0 | 8.3 |

EXAMPLES 6–7

Butene-Ethylene-Propylene Alloys

In order to provide a better understanding of the present invention including representative advantages thereof, particular embodiments of the present invention terpolymer alloys containing a varying ethylene and butene content in the terpolymer component are provided in Table 2 herein. The terpolymer alloys of examples 6 and 7 exhibit a single melting point peak which is indicative of the miscible nature of their two components. These alloys are expected to show a single Tg peak and be exceptionally suitable for soft fiber applications. These examples are not in any way intended as a limitation on the scope of the invention.

TABLE 2

EXAMPLES OF BUTENE-ETHYLENE-PROPYLENE TERPOLYMER ALLOYS

| EXAMPLE # | 6 | 7 |
|---|---|---|
| FIRST COMPONENT | | |
| MFR (G/10 MIN) | 0.3 | 0.4 |
| BUTENE (WT %) | 0.0 | 3.1 |
| C2 (WT %) | 3.5 | 1.6 |
| SECOND COMPONENT | | |
| BUTENE (wt %) | 2.5 | 1.9 |
| C2 (wt. %) | 7.8 | 4.0 |
| AMOUNT OF SECOND COMPONENT (WT %) | 49 | 27 |
| TERPOLYMER ALLOY | | |
| MFR (G/10 MIN) | 1.2 | 1.6 |
| BUTENE (WT %) | 1.2 | 3.6 |
| C2 (WT %) | 3.8 | 2.7 |
| DSC PEAK (° C.) | 138.7 | 136.8 |
| ONSET (° C.) | 123.3 | 120.8 |
| DSC DELTA H (J/g) | 57.6 | 61.8 |

These terpolymers were made in a two stage process consisting of two autorefrigerated continuous stirred tank reactors in series with a gas phase fluidized bed reactor as it is described above in the process section. The process parameters for making the aforementioned terpolymers are given below.

TABLE 3

EXAMPLES OF BUTENE-ETHYLENE-PROPYLENE TERPOLYMER ALLOYS PROCESS CONDITIONS

| EXAMPLE # | 6 | 7 |
|---|---|---|
| CATALYST | FT4S | FT4S |
| ALKYL | TEAL | TEAL |
| ALKYL concentration (ppm per total propylene feed) | 100 | 100 |
| DONOR | MCMS | MCMS |
| DONOR (ppm per total propylene feed) | 40 | 40 |
| FIRST COMPONENT STAGE FIRST REACTOR | | |
| TEMPERATURE (° F.) | 140 | 140 |
| PROPYLENE FEED RATE (LB/HR) | 180 | 160 |
| BUTENE FEED RATE (LB/HR) | 0.0 | 20 |
| HYDROGEN CONCENTRATION (MOLE %) | 0.35 | 0.1 |
| C2 CONCENTRATION (MOLE %) | 2.0 | 1.0 |
| RESIDENCE TIME (HRS) | 8 | 8 |
| FIRST COMPONENT STAGE SECOND REACTOR | | |
| TEMPERATURE (° F.) | 129 | 129 |
| FRESH PROPYLENE FEED RATE (LB/HR) | 100 | 100 |
| FRESH BUTENE FEED RATE (LB/HR) | 0.0 | 0.0 |
| HYDROGEN CONCENTRATION (MOLE %) | 0.35 | 0.1 |
| C2 CONCENTRATION (MOLE %) | 2.0 | 1.0 |
| RESIDENCE TIME (HRS) | ~1.5 | ~1.5 |
| SECOND COMPONENT STAGE REACTOR | | |
| TEMPERATURE (° F) | 158 | 158 |
| PRESSURE (PSIG) | 200 | 200 |
| RESIDENCE TIME | ~2 | ~2 |
| HYDROGEN CONCENTRATION (MOLE %) | 3.0 | 3.0 |
| C2 CONCENTRATION (MOLE %) | 3.0 | 3.0 |
| PROPYLENE CONCENTRATION (MOLE %) | 67.0 | 66.0 |
| BUTENE CONCENTRATION (MOLE %) | 5.0 | 5.0 |
| NITROGEN CONCENTRATION (MOLE %) | 22.0 | 22.0 |

EXAMPLE 8

Fiber Production

Fibers are prepared as spun, partially oriented yarns (POY) by mechanical take-up of the fiber bundle or fully oriented yarns (FOY) by mechanical draw after POY spinning from its extruded melt. This is accomplished on a fiber-line assembled by J. J. Jenkins, Inc. (Stallings, N.C.). The line consists of a 5 cm Davis Standard Extruder (with 30:1 length/diameter ratio) and 6 cc/rev Zenith metering pump forcing molten polymer through a spinneret plate of 72 holes of 0.4 mm and 1.2 length to diameter ratio. A metering pump rate of 10 rpm is employed which will yield a through-put of 0.625 g/hole/minute.

Fibers are drawn from the 232° C. (450 ° F.) melt by an axially spinning unheated godet at 2000 m/min. The fiber bundle, expressed as total denier/total filaments collected at each rate is 20372. The fiber bundles are collected for characterization as five minute runs by a Leesona winder. Fiber testing is performed on an Instron machine, Model 1122 coupled with the Instron computer that supports the Sintech Sima (Testworks II) computerized system for material testing. Instron Pneumatic Cord and Yarn Grips (Model 2714) used for gripping the samples. A sample with 2.5 cm gauge and 0.1 gram pre-load is pulled at 500 mm/min. to break. Break sensitivity was 95 percent drop in force.

Fibers are melt spun from both a 22 and a 100 MFR visbroken versions of ethylene-propylene copolymer alloys having an ethylene content of about 7% by weight of the alloy. These embodiments of the invention copolymer alloy are produced as previously described. Fibers spun from a conventional traditionally polypropylene random copolymer containing 3 percent ethylene which is subjected to controlled rheology treatment (post-reactor oxidative degradation) having about 33 MFR (Exxon Chemical Company, PD-9355) and will serve for comparison. Results obtained from tenacity and elongation testing of those fibers which are spun with take-up rates of 2000 mmin are shown in FIG. 6.

EXAMPLE 9

Spunbond Process and Fabrics

Spunbonded nonwoven fabric is prepared on a one meter Reicofil Spunbond line made by the Reifenhauser GMBH of Troisdorf, Germany. The Reicofil employs a 7 cm (2.75 in.) extruder with a 30:1 length:diameter ratio. There are 3719 die plate holes, each having a diameter of 0.4 mm with L/D=4/1.

In the following examples, spunbond layers of 17 g/m$^2$ (0.50 oz/yd$^2$) are prepared. The processing conditions are typical of those employed in Reicofil operation. They include a 420° F. (215° C.) die melt temperature, 45–50° F. (6–10° C.) cooling air temperature, and a 21 mmin belt speed. The process parameters and the fabric properties of the spunbond fabric are provided herein.

TABLE 4

SPUNBONDED FABRICS

| BASE RESIN | 7 wt % INVENTION COPOLYMER | 3% RCP EXXON PD-9355 | 5% RCP CONVENTIONAL EXPERIMENTAL |
|---|---|---|---|
| CR'D RESIN | YES | YES | YES |
| MFR | 35 | 35 | 35 |
| MWD | 2.4 | 2.3 | 2.4 |
| SPUNBOND PROCESS PARAMETERS | | | |
| EXTRUDER TEMP. (F.) | 420° F. | 420° F. | 420° F. |
| THROUGH PUT RATE (gram/hole/min) | 0.35 | 0.35 | 0.35 |
| AIR JET SPEED (m/min) | 2,000 | 2,000 | 2,000 |
| AIR JET TEMP (F.) | 40° F. | 40° F. | 40° F. |
| FIBER DIAMETER (microns) | 25 | 25 | 25 |
| BONDING TEMP. (F.) | 210 | 230 | 220 |
| FABRIC PROPERTIES | | | |
| SOFTNESS (Handle-O-Meter) | 0.33 | 0.96 | 0.55 |
| BASIS WEIGHT (gram/m2) | 40 | 40 | 40 |

EXAMPLE 10 (prospective)

Melt Blowing Procedure

Melt blown fabric layers are prepared employing a 51 cm (20 inch) Accurate Products Melt Blown line built by Accuweb Meltblown Systems of Hillside, N.J. The extruder is a 5 cm (2 in) Davis Standard with a 30:1 length:diameter ratio. The die nozzle has 501 die holes. The diameter of each is 0.4 mm (0.15 in.). Die length:diameter ratio is 15:1 and the air gap is set to 0.15 mm (0.060 in.). Melt blown fabric layers are prepared with weights of about 30 g/m$^2$ (0.88 oz/yd$^2$).

Representative processing conditions include a polymer melt temperature of 520° F. (271° C.) and an air temperature of 520° F. (271° C.).

The technology of preparing meltblown fabrics is also well known in the art of nonwoven fabric preparation production. An overview of the process may be obtained from "Melt Blown Process", *Melt Blown Technology Today,* Miller Freeman Publications, Inc. San Francisco, Calif., 1989, pps. 7–12.

Optimum Bonding Temperature Determination

The Optimum Bonding Temperature (OBT) is found by evaluation of the thermal bonding curve. The OBT is the point-bond calendar temperature at which the peak bonding strength for a laminated nonwoven fabric is developed. The thermal bonding curve and OBT is determined in two steps.

1. Unbonded fabric laminates are passed through the nip of heated calendar rolls. The rolls are heated at temperatures between 200° F. (94° C.) and 320° F. (160° C.) in 5° F. (~2.8° C.) increments. A series of fabric samples each bonded at a different temperature is produced.

2. The machine direction (MD) and transverse direction (TD) tensile strengths are then measured as set forth in ASTM D 1682-64 (reapproved 1975). The bonding curves are graphic comparisions of calendar temperature and peak bond strength in MD and TD.

Comparisions of bonding temperature and peak bond strength on the bonding curves permits identification of the OBT.

Control Resins

In the examples which follow, a commercial 32–38 dg/min MFR controlled rheology polypropylene random copolymer polypropylene having about 3% by weight ethylene is employed in preparation of control spunbonded fabrics. The specific polymer is PD-9355 available from Exxon Chemical Company, Houston, Tex.

Control melt blown fabrics are prepared from Exxon's commercial PD-3795G which is a peroxide coated granular polyrpopylene homopolymer having a MFR of about 800 dg/min.

PROSPECTIVE EXAMPLE 11

Preparation of SM AND SMS Fabrics Laminated with Invention Copolymer Alloys An unbonded, bilayer (SM) fabric consisting of a spunbonded layer (S) and a melt blown layer (M) is prepared. The M layer, made with the commercial 800 MFR polypropylene, is directly extruded on the web of the S-layer. The latter is made from a 35 MFR invention ethylene-propylene copolymer alloy having an ethylene content of about 7% by weight of the copolymer. This embodiment of the copolymer alloy invention is described previously and its main design characteristics and properties are shown in Table 1. The OBT of the bilayer fabric is then evaluated by point bonding of the fabric with heated calendar rolls and subsequent preparation and analysis of a thermal bonding curve. The anticipated properties are given below in Table 5 as compared to a control bilayer fabric.

A second S layer made from the copolymer alloy may be laminated either on-line or off-line to form a composite SMS fabric.

Many modifications and variations besides the embodiments specifically mentioned may be made in the compositions and methods described herein without departing from the concept of the present invention. Accordingly it should be clearly understood that the form of the invention described and illustrated herein is exemplary only, and is not intended as a limitation on the scope thereof.

TABLE 5

SM PROSPECTIVE EXAMPLES

| | S-LAYER | M-LAYER | OBT (F) | STRENGTH | BARRIER & FILTRATION | SOFTNESS |
|---|---|---|---|---|---|---|
| CONTROL | PD-9355 | PD-3795G | 260 | GOOD | GOOD | GOOD |
| EXAMPLE | 7% COPOLYMER ALLOY | PD-3795G | 210 | GOOD | GOOD | EXCELLENT |

We claim:

1. An ethylene-propylene copolymer alloy, said alloy having a substantially single glass transition temperature, an ethylene content of from about 5 to about 8% by weight of the alloy, and a melt flow rate of from about 3 to about 150 g/10 minutes said alloy comprising:
   (a) a ethylene-propylene random copolymer having an ethylene content of from about 0.1 to about 6.0% by weight, said random copolymer having a MFR of from about 0.1 to about 250, present in an amount of from about 40 to about 90% by weight of the alloy; and
   (b) an ethylene-propylene bipolymer present in an amount of from about 10 to about 60% by weight of the alloy, said bipolymer having an ethylene content equal or lower than a critical value to ensure the miscibility of the random and bipolymer copolymers.

2. A polymer alloy suitable for soft nonwoven fabric applications comprising two distinct, miscible copolymers of propylene with at least one other alpha-olefin.

3. A butene-ethylene-propylene terpolymer alloy comprising two components, the first component being a polymer selected from the group consisting of ethylene-propylene random copolymers, butene-propylene random copolymers, and butene-ethylene-propylene terpolymer, the second component being a polymer selected from the group consisting of ethylene-propylene random copolymers, butene-propylene random copolymers, and butene-ethylene-propylene terpolymers, wherein said two components are distinct but miscible.

4. The butene-ethylene-propylene alloy of claim 3, wherein the alloy is further characterized as having a melting point peak in the range of from about 110 to about 140° C.

5. A process for producing a miscible ethylene-propylene copolymer alloy comprising:
   (a) polymerizing a mixture of ethylene and propylene, in the presence of a catalyst system to form a random copolymer having an ethylene content of 1–3% by weight in an amount corresponding to 40–90% by weight of the alloy;
   (b) in the presence of said catalyst containing random copolymer, further polymerizing a mixture of ethylene and propylene, and controlling the ethylene/propylene mole ratio in the reacting medium at or below a critical value to form an ethylene-propylene bipolymer that is miscible with said random copolymer.

6. The process of claim 5, wherein the random copolymer is made in a liquid reactor and the bipolymer is made in a gas phase reactor.

7. The polymer alloy of claim 2, wherein said alloy has a substantially single glass transition temperature, and a melt flow rate of from about 3 to about 150 g/10 minutes, said alloy comprising:
   (a) a random copolymer of propylene and at least one other alpha-olefin, said random copolymer having a MFR of from about 0.1 to about 250, present in an amount of from about 40 to 90% by weight of the alloy; and
   (b) an ethylene-propylene bipolymer present in an amount of from about 10 to about 60% weight of the alloy, said bipolymer having an ethylene content equal or lower than a critical value to ensure the miscibility of the random and bipolymer copolymers.

8. The polymer alloy of claim 7 wherein said alloy has an ethylene content of from about 5 to about 8% by weight of the alloy and wherein said random copolymer has an ethylene content of from about 0.1 to about 6.0% by weight.

9. The polymer alloy of claims 2 or 7 wherein said α-olefin is ethylene.

10. The polymer alloy of claim 2 or 7, wherein the alpha-olefin is selected from the group consisting of ethylene, 1-butene, 1-hexene, and 1-octene.

* * * * *